United States Patent
Dixon et al.

(10) Patent No.: US 9,406,064 B2
(45) Date of Patent: Aug. 2, 2016

(54) ADVANCED DECISION LOGIC FOR TRANSIT ACCEPTANCE

(75) Inventors: Philip B. Dixon, San Diego, CA (US); Stephen W. Sansom, San Diego, CA (US); Christopher Lee Knauft, Bellingham, WA (US)

(73) Assignee: Cubic Corporation, San Diego, CA (US)

( * ) Notice: Subject to any disclaimer, the term of this patent is extended or adjusted under 35 U.S.C. 154(b) by 265 days.

(21) Appl. No.: 13/217,483

(22) Filed: Aug. 25, 2011

(65) Prior Publication Data

US 2012/0221381 A1    Aug. 30, 2012

Related U.S. Application Data (60) Provisional application No. 61/377,045, filed on Aug. 25, 2010.

(51) Int. Cl.
*G07B 15/02*    (2011.01)
*G06Q 20/32*    (2012.01)
*G06Q 20/20*    (2012.01)
*G07C 9/00*    (2006.01)

(52) U.S. Cl.
CPC ............ *G06Q 20/3278* (2013.01); *G06Q 20/20* (2013.01); *G06Q 20/32* (2013.01); *G07C 9/00031* (2013.01)

(58) Field of Classification Search
CPC . G06Q 20/3278; G06Q 20/027; G06Q 20/32; G06Q 20/04
USPC .......................... 705/13, 44, 76; 235/380, 382
See application file for complete search history.

(56) References Cited

U.S. PATENT DOCUMENTS

| | | | |
|---|---|---|---|
| 7,562,818 B1 | 7/2009 | Bierbaum et al. | |
| 7,567,920 B2* | 7/2009 | Hammad | G06Q 20/32 705/13 |
| 2008/0033880 A1* | 2/2008 | Fiebiger | G06Q 20/20 705/44 |
| 2008/0140516 A1* | 6/2008 | Silbernagl | G06Q 20/18 705/13 |
| 2008/0179395 A1* | 7/2008 | Dixon | G06Q 20/027 235/380 |
| 2011/0000962 A1* | 1/2011 | Chan et al. | 235/382 |

FOREIGN PATENT DOCUMENTS

WO    WO 2008/070642 A2    6/2008

OTHER PUBLICATIONS

International Search Report and Written Opinion dated Nov. 23, 2011 for International PCT Application No. PCT/US2011/049185, 10 pages.

* cited by examiner

*Primary Examiner* — Freda A Nelson
(74) *Attorney, Agent, or Firm* — Kilpatrick Townsend & Stockton LLP (57) ABSTRACT

Techniques are disclosed for determining whether to grant a user access at an access control point of a transit system based on information about a user associated with a fare media from one or more information sources. These techniques can include receiving an authorization response after attempting to authorize payment from a fare media, and accessing at least one information source. This can include accessing historical information regarding prior transactions in the transit system made with the fare media. A determination can then be made whether to grant a user access at the access control point of the transit system.

21 Claims, 8 Drawing Sheets

ADVANCED DECISION LOGIC FOR TRANSIT ACCEPTANCE

CROSS-REFERENCES TO RELATED APPLICATIONS

The present application claims benefit under 35 USC 119 (e) of U.S. Provisional Application No. 61/377,045, filed on Aug. 25, 2010 of which the entire disclosure is incorporated herein by reference for all purposes.

BACKGROUND OF THE INVENTION

As transit systems throughout the world continue to mature, so do the technologies that support them. The transit industry traditionally has provided for fare payment collection using used "closed-loop" fare media, which has a readable memory that stores transit value or fare products. Recently, however, transit systems have been able to support the use of "open-loop" bank cards, such as credit and debit cards, which can be used to conduct financial transactions outside the transit system. This ability to allow open-loop bank cards to be used as fare media provides added convenience to transit users.

Enabling open-loop bank cards as fare media in a transit system can have drawbacks, however. It can often take several seconds or more to authorize payment from an open-loop bank card, which would cause unreasonable delays at turnstiles, fareboxes, and other access control points in the transit system with a high volume of transit users. Thus, payment authorization information typically is accomplished after a transit user has been granted access at an access control point. If payment authorization is declined, however, a transit service provider may not get payment for a user's access to the transit system. Furthermore, a transit system that simply denies a user access based on the user's use of an open-loop card that has been previously declined might be doing so needlessly if the card has since been restored to good standing.

SUMMARY OF THE INVENTION

Techniques are disclosed for determining whether to grant a user access at an access control point of a transit system based on information about a user associated with a fare media from one or more information sources. These techniques can include receiving an authorization response after attempting to authorize payment from a fare media, and accessing at least one information source. This can include accessing historical information regarding prior transactions in the transit system made with the fare media. A determination can then be made whether to grant a user access at the access control point of the transit system.

An example method for determining to grant access to a user at an access control point of a transit system, according to the disclosure, can include receiving an account identifier from a fare media at a first time. The account identifier can be unique to the fare media and associated with a financial account. The method also can include sending information indicative of the account identifier for authorization of a payment, receiving a denial code indicating a denial of the authorization of the payment, and accessing at least one information source having information related to the user. The at least one information source can include historical information regarding prior transactions in the transit system made with the fare media. The method further can include making a determination to grant access to the user at the access control point of the transit system based, at least in part, on the denial code and the information related to the user from the at least one information source, receiving, at the access control point, the account identifier from the fare media at a second time, and granting access to the user at the access control point of the transit system.

The example method for determining to grant access to a user at an access control point of a transit system can include one or more of the following features. Sending information indicative of the determination to the access control point. Storing the information indicative of the determination at the access control point. Storing the information indicative of the determination on a list having information for granting access to the transit system. The information related to the user can comprise a value. Updating the value based, at least in part, on the denial code. Making the determination whether to grant access to the user at the access control point of the transit system can be based, at least in part, on whether the value exceeds a certain threshold value. The at least one information source can comprise one or more of a financial institution associated with the financial account, an employer system, or a government system. The historical information regarding prior transactions can comprise one or more of a use history, a recharge history, or a velocity history.

An example system for executing advanced decision logic for transit acceptance, according to the disclosure, can include a communication interface coupled to a data communication network and configured to receive information indicative of an account identifier from a fare media at a first time. The account identifier can be unique to the fare media and associated with a financial account. The system also can include an authorization subsystem configured to send information indicative of the account identifier for authorization of a payment and receive an authorization response indicating a denial or acceptance of the authorization of the payment. Additionally, the system can include a processor communicatively coupled with the communication interface and the authorization subsystem, and configured to access at least one information source having information related to a user associated with the account identifier. The at least one information source can include historical information regarding prior transit transactions made with the fare media. The processor further can be configured to make a determination whether to grant access to the user at the access control point of the transit system based, at least in part, on the authorization response and the information related to the user from the at least one information source, and send information indicative of the determination using the communication interface.

The example system for executing advanced decision logic for transit acceptance additionally can include one or more of the following features. A database configured to store at least a portion of the historical information regarding the prior transit transactions made with the fare media. An access control point communicatively coupled with the communication interface and configured to receive the information indicative of the determination. The access control point can include a memory configured to store the information indicative of the determination on a list having information for granting access to the transit system. The processor can be configured to make the determination whether to grant access to the user at the access control point of the transit system based, at least in part, on whether a value computed using the information related to the user exceeds a certain threshold value.

An example non-transitory storage medium with computer-readable instructions for determining whether to grant access to a user at an access control point of a transit system, according to the disclosure can have instructions comprising code for receiving an account identifier from a fare media at a first time. The account identifier can be unique to the fare media and associated with a financial account. The instructions further can comprise code for sending information indicative of the account identifier for authorization of a payment, receiving an authorization response indicating a denial or acceptance of the authorization of the payment, and accessing at least one information source having information related to the user. The at least one information source can include historical information regarding prior transactions in the transit system made with the fare media. The instructions also can comprise code for making a determination whether to grant access to the user at the access control point of the transit system based, at least in part, on the authorization response and the information related to the user from the at least one information source, receiving, at the access control point, the account identifier from the fare media at a second time, and performing an action at the access control point based on the determination.

The example non-transitory storage medium with computer-readable instructions for determining whether to grant access to a user at an access control point of a transit system also can include one or more of the following features. Instructions comprising the code for performing the action at the access control point include instructions for granting access to the user at the access control point of the transit system. Instructions further comprising code for sending information indicative of the determination to the access control point. Instructions further comprising code for storing the information indicative of the determination at the access control point. The information related to the user can comprise a value. Instructions further comprising code for updating the value based, at least in part, on the authorization response.

DETAILED DESCRIPTION OF THE INVENTION

In the following description, for the purposes of explanation, numerous specific details are set forth in order to provide a thorough understanding of various embodiments. It will be apparent, however, to one skilled in the art that various embodiments may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosed systems and methods as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

The term "open-loop bank cards" as used herein refers to credit cards, debit cards, and other payment cards that can be used to conduct financial transactions outside the transit system. This includes branded payment cards, such as Visa®, MasterCard®, and American Express®. Although this disclosure frequently refers to open-loop bank cards in descriptions and examples provided herein, the corresponding concepts may be extended to various other forms of fare media requiring authorization from an entity external to a transit system.

Access control points of a transit system can include turnstiles, faregates, platform validators, para-transit vehicles, buses, conductor handheld units, or fare boxes at a entry, exit, or other location of a transit station. These access control points frequently execute transactions relating to a transit user's entry to and/or exit from the transit system, or a transit user's passing from one location within the transit system to another location within the transit system. Such transactions typically need to be quick, often 500 milliseconds or less. A closed-loop card typically comprises a stored-value card (e.g., such as a transit fare card and/or other smart card that can store a value and historical information on the card) that enables an access control point to conduct a transaction locally, retrieving information stored on the card to calculate a fare. Transactions using stored-value fare media therefore can be faster than transactions that would, for example, retrieve information from a remote source, such as a central database.

On the other hand, enabling open-loop bank cards, such as bank cards and/or other payment cards, to be used as fare media in a transit system can provide added convenience to a transit user by utilizing a media that the transit user already has in possession and/or the transit user can use for financial transactions outside the transit system. The transit user therefore does not have to purchase, load, or carry a separate closed-loop card for use in the transit system. The process of accepting open-loop bank cards at access control points in the transit system, however, is different than that of accepting closed-loop cards. The access control point cannot, for example, simply read a balance amount from the open-loop bank card, subtract a fare value, and write the updated balance to the open-loop bank card. Open-loop bank card processing utilizes centralized accounts held at the issuer host computer to maintain value balance and status for each card. Thus, to process a transaction, a transit system must send transaction information the issuer of the open-loop bank card to check account value balance (and other account parameters such as payment history and status) and to authorize or decline the transaction. Payment authorization (also known as "transaction authorization") is an online process used for a retail merchant to be guaranteed payment. Typically, according to the rules of the issuing bank, if a payment is not authorized at the time of the transaction, the merchant is liable for non payment. However, payment authorization can take several seconds, and because delaying transit users several seconds at an access control point in the transit system can cause undesirable delays to the flow of customers through the access control points of the transit system, payment authorization is often conducted after a transit user is granted access at an access control point. Because payment authorization has not been accepted before the transit user is granted access, the transit agency bears a risk of nonpayment for the fare of a first ride. This is known as "first ride risk."

To help ensure open-loop bank cards for which payment authentication is not granted are not used as fare media for multiple rides, lists are frequently used by access control points of the transit system. Such lists can include positive and/or negative lists containing identification information of numerous open-loop bank cards, which enable the access control point to make a quick determination of whether to grant a transit user access in the transit system. For example, if identification information for a particular open-loop bank card is on a negative list, the access control point will automatically deny access when that open-loop bank card is used. An open-loop bank card is often added to a negative list automatically if a bank declines payment authorization for a transaction for which the open-loop bank card is used as payment, thereby preventing subsequent transit rides using the same open-loop bank card. On the other hand, if the identification information for the open-loop bank card is on a positive list, the access control point will automatically grant access when the open-loop bank card is used. Positive lists, containing identification information of known good cards, can be built based on pre-registration by transit users. The process of looking up information on a list can take a fraction of a second, so there are no unacceptable delays at the access control point. These lists, however, are made after the fact and often are based solely on after-the-fact decline or approval information from the bank.

According to the techniques provided herein, the transit system can access one or more information sources to inform advanced decision logic that intelligently determines whether to allow a transit user access at an access control point of the transit system by determining the likelihood that the fare will eventually get paid. These determinations can be made beforehand, and used to create positive and/or negative lists stored at the access control points, where the lists store acceptable and non-acceptable open-loop bank cards, respectively. This can be particularly beneficial in situations where access control points may not have the communications infrastructure to always go online to check balance or account status in real time. According to alternative embodiments, if a determination has not been made before an open-loop bank card is used for the first time, the a transit agency can either accept first ride risk or not allow passengers access without advanced registration or payment. Alternatively, if the access control points have capable connectivity, information from the one or more information sources may be collected and used by an access control point in real time.

As an example, a payment authorization for an open-loop bank card used to pay a fare at an access control point of a transit system may be denied by the issuing bank, but the transit system may recognize that this particular open-loop bank card has a tendency to have insufficient funds each week that will be replenished at the end of the week with a paycheck. The bank may decline due to insufficient funds on Thursday, but the transit system might know from history that the open-loop bank card will be made good again at the end of the week and thus payment will be made. The transit system can therefore allow the transit user access and accept the transaction made by the open-loop bank card, knowing that the risk to accept this transaction is low because payment likely will be forthcoming at the end of the week. This is just one example of intelligent or advanced decision logic that can be applied.

This advanced decision logic techniques provided herein can minimize payment risk and maximize user experience, allowing a transit agency to maximize revenue and minimize calls to the customer service office in embodiments. Transit users will, in turn, be more inclined to use the transit system if their cards are readily accepted. A transit user can appreciate that even though an open-loop bank card may be bad one day, the transit system can predict that it will be good the next. A credit card bill may not be paid one day, but is paid the next, thus changing its status from bad to good, or vice versa. A debit or prepaid card account may not have money in the account one day, but may be funded the next changing the account from bad to good. Embodiments not only can take these factors into account, but also can allow for logic that can be added and changed over time to make the patron experience a better one based on knowledge of that particular patron history. In some embodiments, a transit system can recover losses from declined payments by accumulating fare costs and submitting an accumulated total at a subsequent time the open-loop bank card is used in the transit system.

Figure 1:
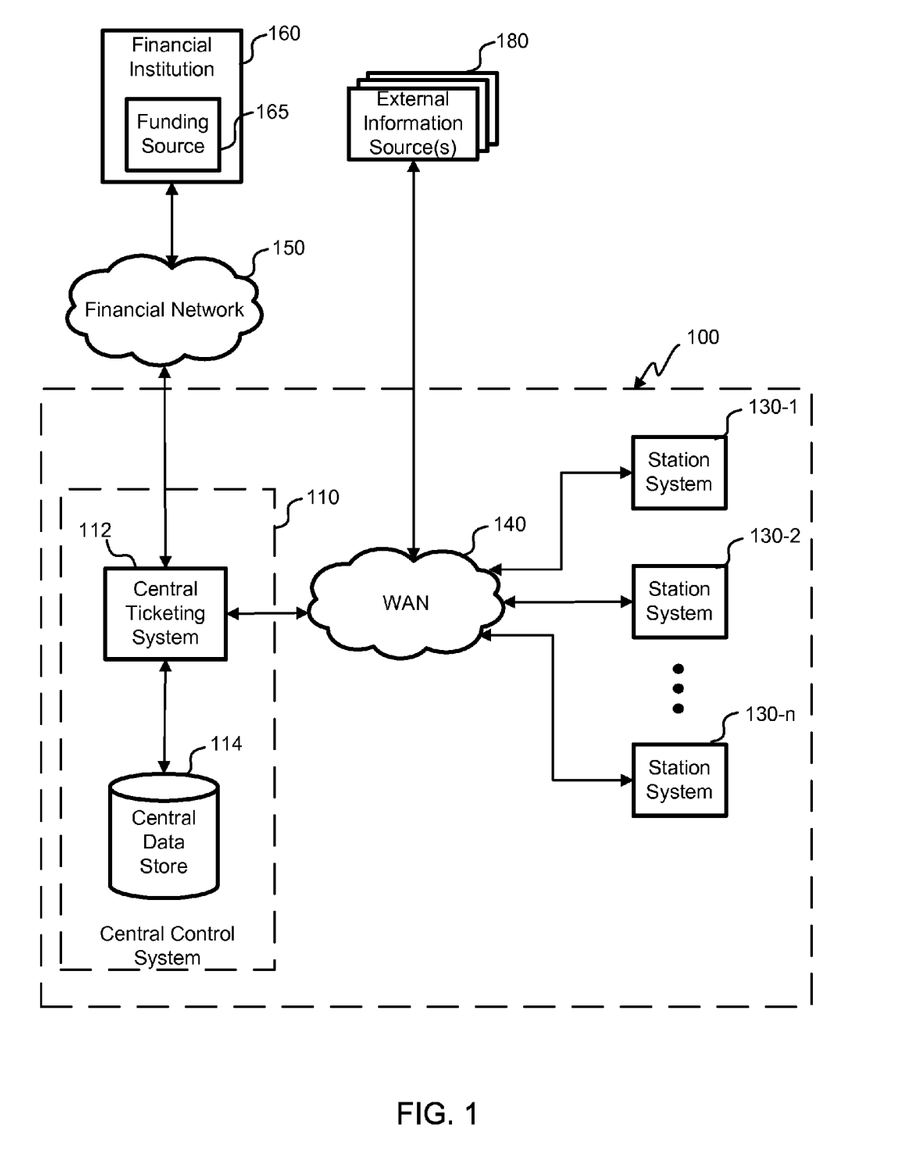
FIG. 1 is a block diagram of an embodiment of a transit system that can utilize advanced decision logic to help determine whether to grant a user access at an access control point of the transit system.

FIG. 1 is a block diagram of an embodiment of a transit system 100 that can utilize the advanced decision logic techniques described herein. The transit system 100 can include various forms of transit, including subway, bus, ferry commuter rail, para-transit, etc., or any combination thereof. It will be recognized that such a transit system 100 can be enabled for use in applications beyond transit, such as transportation systems (e.g., airline systems, car rental systems, etc.). Optionally, the transit system 100 can provide for transit user accounts, which include information regarding a transit user and purchased transit products.

A central ticketing system 112 can comprise one or more servers and/or other computing systems having processors, memories, and network and/or other communication interfaces for processing and communicating information. The central ticketing system 112 can include an account-based processor configured to process and log transaction data related to transactions conducted by fare media, such as open-loop bank cards, in the transit system 100. This data can be stored and/or maintained on a database, such as a central data store 114 of a central control system 110. The central ticketing system 112 also can compile transactional data for use by the transit system and/or government agencies, reconcile payments with financial institutions, process transactional data in accordance with governing regulations and/or laws, etc.

A funding source 165 for a transit user account can provide funding to purchase products and/or pay for access at access control points of the transit system 100. The funding source 165 can be external to the central control system 110 and maintained, for example, by a financial institution 160, such as a merchant bank or credit union, or other entity maintaining the funding source 165. The funding source 165 may include a savings or checking account, a prepaid account, a credit account, an e-commerce account (such as a PAYPAL® account), or more, which can transfer funds via automated clearing house (ACH) or other means. The central ticketing system 112 can communicate with the financial institution 160 (or other entity maintaining the funding source 165) through a financial network 150. To ensure security of the communication between the central ticketing system 112 and the financial institution 160, the central ticketing system 112 can utilize a certified payment gateway (not shown).

The central ticketing system's reconciliation with a funding source 165 may vary, depending on desired functionality. For example, transactions, such as a fare payment by a user at an access control point can be recorded and/or tracked by the central ticketing system 112 and reconciled, on a per-transaction basis and/or collectively with other transactions. To this end, the central ticketing system 112 may reconcile payment for the transactions with the funding source 165 as the transactions are received and/or on a scheduled basis, such as on an hourly or daily basis. In some embodiments, the central ticketing system 112 is configured to request payment authorization every 5 minutes or less to help ensure that a transit user does not have the opportunity to conduct another transaction in the transit system 100 with a particular open-loop bank card before payment authorization for a previous transaction with the open-loop bank card is granted or denied. In other embodiments, the payment authorization occurs every 10, 15, or 20 minutes or less, depending on a calculated length of time of transit rides. Yet other embodiments may allow periods of two or more hours between payment authorization requests. By timing payment authorization in this manner, a transit system 100 can help reduce the risk of failing to receive payment for multiple transactions made by a single open-loop bank card.

Station systems 130 can gather information regarding transactions and communicate the information to the central ticketing system 112 using a wide area network (WAN) 140. The WAN 140 can include one or more public and/or private networks, including the Internet, which may be internal to the transit system 100, external to the transit system 100, or both. The WAN 140 can include packet-switched and/or circuit-switched connections using telephone lines, coaxial cable, optical fiber, wireless communication, satellite links, and/or other mechanisms for communication. Communication between the station systems 130 and the central control system 110 may be in real time or periodic. Thus, the usage of fare media throughout the transit system 100 can be tracked.

As discussed above, the central ticketing system 112 can process transactions conducted throughout transit system 100. Additionally, the central ticketing system 112 can execute advanced decision logic to help access control points determine whether to grant access to a transit user. Such advanced decision logic, described in more detail below, can utilize transaction history information stored on the central data store 114 as well as additional information sources, including external information source(s) 180. External information source(s) can include an issuing bank, employer system(s), government system(s), etc., described in more detail below.

Figure 2:
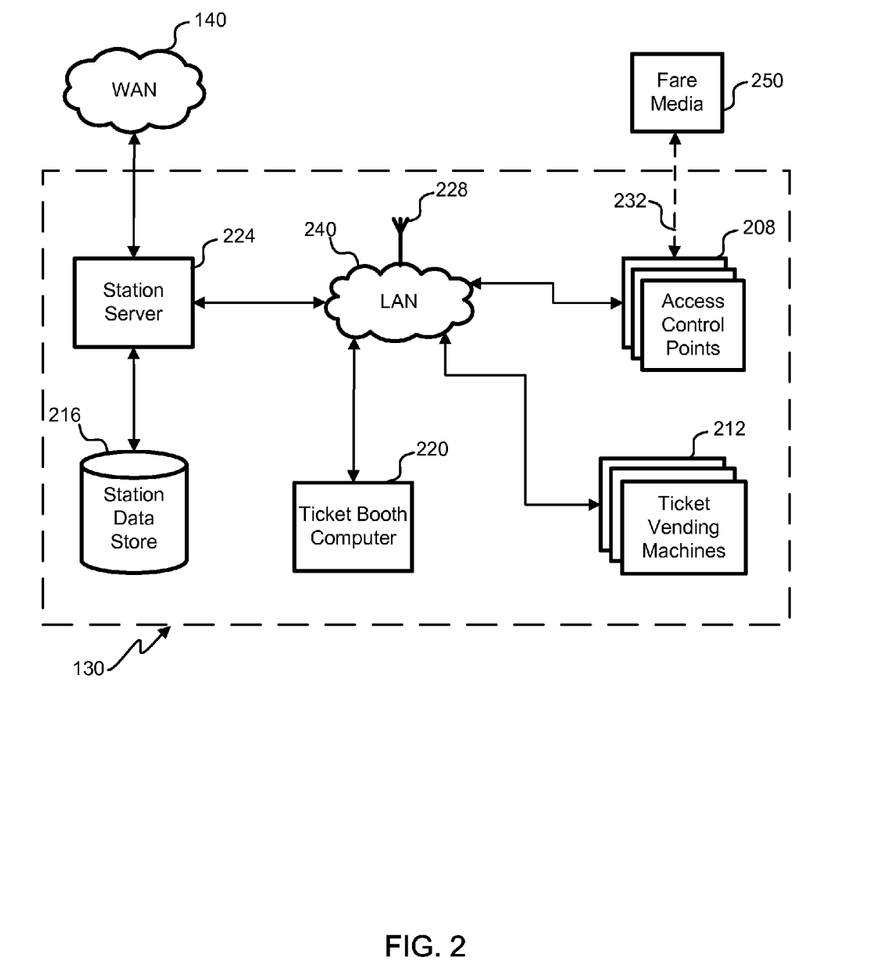
FIG. 2 is a block diagram of an embodiment of a transit station system.

FIG. 2 shows a block diagram of an embodiment of a transit station system 130. As discussed above, transit system 100 can include various forms of transit, such as subway, bus, ferry, commuter rail, para-transit, and more. Because different forms of transit may require different functionality, various transit station systems 130 may have some or all of the components shown in the block diagram. A local area network (LAN) 240 can communicatively couple the various components together and can include point-to-point connections, packet switched connections, wireless connections, and/or other networking techniques.

A station server 224 can be a computer server coupled to the WAN 140 to allow communication with the central ticketing system 112. Processing of local information can be performed on the station server 224. For example, fare information, schedule information, delay update information, and other transit related information can be processed at the station server 224 and communicated to the various other components of the transit system 100.

A ticket booth computer 220, access control points 208, and transit vending machines (TVMs) 212 can communicate with the central ticketing system 112 through the station server 224 or directly with the central ticketing system 112 through LAN 240 or WAN 140 (e.g., the Internet). According to some embodiments, access control points 208 collect information from a fare media 250, including open-loop bank cards, at various locations in the transit station system 130. The access control points 208 can come in various forms such as turnstiles, faregates, platform validators, para-transit vehicles, busses, conductor handheld units, and/or fare boxes. According to some embodiments, the access control points 208 also can communicate with the station server 224 and/or central ticketing system 112 to determine whether to grant a user access when fare media 250 has been presented at the access control points 208. In these embodiments, a unique ID corresponding to the fare media 250 can be stored on lists in the station data store 216. These lists can be updated on a regular basis to reflect other transactions of the fare media 250 throughout the transit system 100. In other embodiments, the access control points 208 do not communicate with other devices to make the determination of whether to grant a transit user access. In these embodiments lists of unique IDs of fare media 250 can be stored at or near the access control points 208.

Access control points 208 of the transit system 100 can be configured to read information from one or more sources of information on a fare media 250. To do so, access control points 208 can employ one or more technologies, such as WIFI, BLUETOOTH®, bar-code and/or other optical scanning Access control points 208 may also employ near-field communication (NFC) technologies to read information from RFID tags, NFC-enabled mobile devices (such as certain personal digital assistants (PDAs), mobile phones, and other portable and/or personal electronics), contactless payment cards, and other contactless devices.

The access control points 208, TVMs 212, and one or more ticket booth computers 220, can communicate with the station server 224 via the LAN 204. This communication can be transmitted via a physical connection or wireless connection via one or more antennas 228. Transactions at access control points 208, TVMs 212, and one or more ticket booth computers 220 can be communicated to the station server 224, stored at station data store 216, and/or transmitted to central ticketing system, which can process the transactions accordingly.

Various items can be used as fare media 250, whether or not the media is issued by a transit services provider. These items can include media such as identification cards, payment cards, personal electronic devices, bar codes and items having bar codes, NFC-enabled media, and more. NFC-enabled media can have a unique ID collected by access control points 208 though NFC signals (e.g., radio frequency (RF) signals). By way of example, but not by limitation, such NFC-enabled media can include devices comprising RFID tags and/or RFID-tagged items, contactless payment cards (including but not limited to credit cards, prepaid cards, debit cards, or other bank cards or contactless smart cards.), contactless identification cards and/or fobs, and NFC-enabled mobile devices. As discussed above, some forms of fare media 250 can include a stored value that maintains a running balance used to pay a fare in the transit system. Additionally or alternatively, the fare media can be linked to an account with the transit system 100 and/or a financial institution 160 with a funding source 165 to pay for fare and/or other products and services of the transit system 100.

For open-loop bank cards, a primary account number (PAN) associated with a payment card and/or financial account can be used as a unique ID for processing transactions. That said, the unique ID need not be so limited. All or part of the information collected by a access control point 208 from fare media 250 can be used as a unique ID. This unique ID can comprise one or more fields of data including or based on information such as a name, a birth date, an identification number, a social security number, a drivers license number, a media access control (MAC) address, an electronic serial number (ESN), an international mobile equipment identifier (IMEI), a biometric measurement, and more. Because the unique ID is unique, it can be associated with a virtual fare card and/or transit user account, and utilized by a user at a TVM 212 to access and/or update information associated with the virtual fare card and/or transit user account.

Figure 3A:
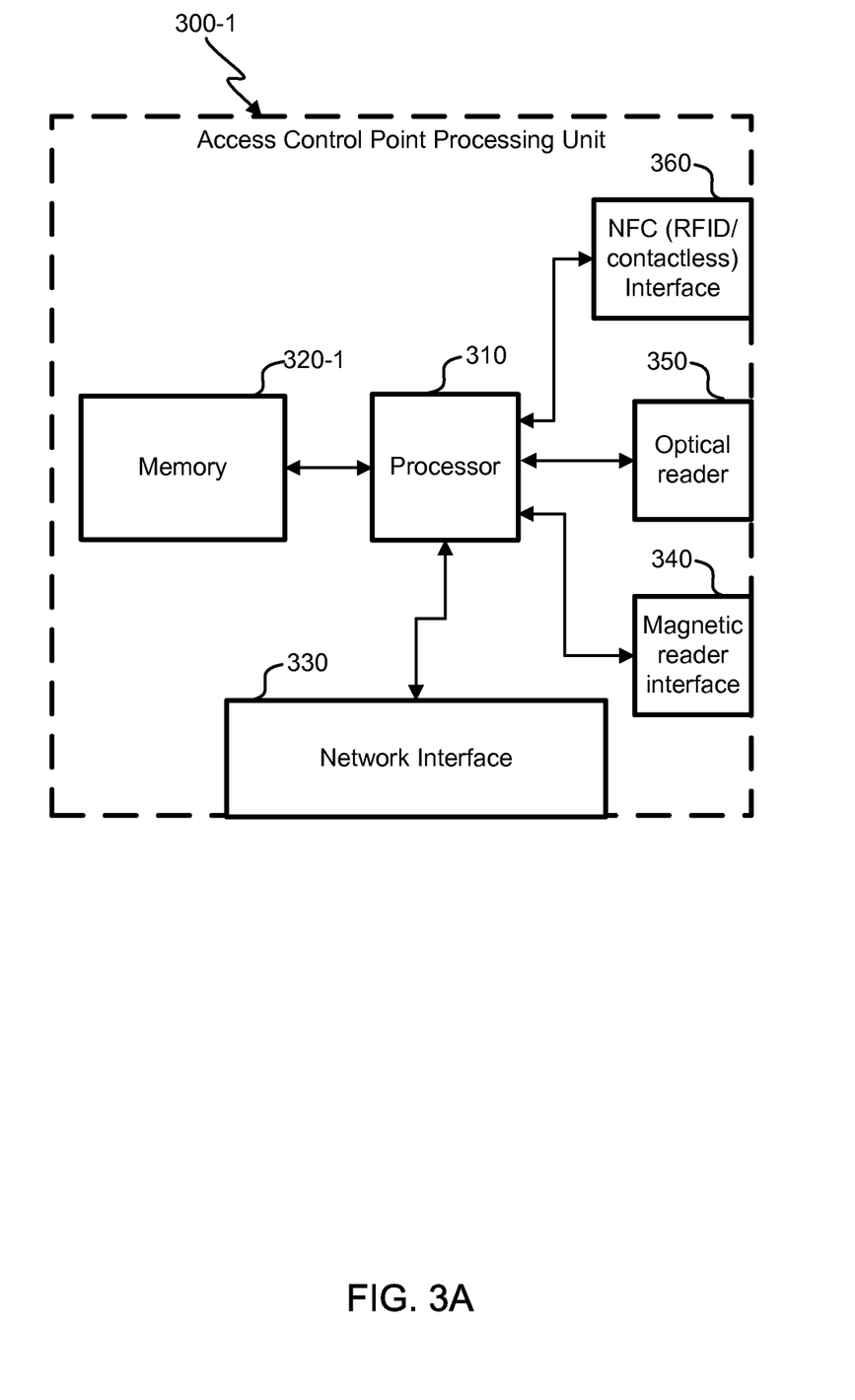
FIG. 3A is a block diagram of an embodiment of a access control point processing unit that can be used in various embodiments the transit system described herein.

FIG. 3A is a simplified block diagram of an embodiment of an access control point processing unit 300-1, which can be coupled with and/or integrated into access control points 208 of a transit system 100 and can control certain physical properties of access control points 208 to allow or deny physical passage of a user at a location of the transit system 100. Interfaces such as an NFC interface 360 (which can read RFID and contactless card information, among others), optical reader 350, and/or magnetic reader interface 340, can be used to collect information from fare media 250, including the unique ID. The information can then be sent to the access control point processing unit 300-1.

In addition to performing any decryption and/or verifying any security features, the processor 310 can compare the unique ID against lists stored in memory 320-1 and/or other data store to determine whether to allow passage of the user at the access control point 208 or another physical location in the transit system 100. This can enable a access control point 208 to make a quick determination of whether to allow a transit user passage at a location in the transit system 100 without the need to communicate information to a remote device.

Lists, which can include the unique ID and additional information such as a product associated with the unique ID, can be generated and maintained from a central system. This central system, such as the central ticketing system 112, can update lists on a regular basis to reflect other transactions of the fare media throughout the transit system 100. The central system can send updated list information to station server 224 via WAN 140 or directly with the central ticketing system 112 through WAN 140 (e.g., the Internet) or LAN 240. The station server 224 can store updated lists at the station data store 216 and/or communicate the updated lists information via LAN 240 to access control point processing unit 300-1, which can receive the information at network interface 330 and or store the list in memory 320-1. The access control point processing unit 300-1 can be coupled with an output interface (not shown), such as a display or audio speaker, to indicate when passage is allowed or denied, among other information.

Lists used by access control point processing units 300-1, station servers 224, and/or other devices in the transit system 100 for determining whether to allow passage of a transit user at a location in the transit system 100 can include one or more positive lists and/or negative lists. If, for example, the unique ID is found on the negative list, the processor 310 can determine to deny passage of the user. On the other hand, if the unique ID is found on a positive list, the processor 310 can determine to allow passage of the user. Additional rules may be implemented if the unique ID is found on both positive or negative lists, or is not found on any list. That said, it will be understood that precautions can be made to ensure that these two latter scenarios rarely happen. It also will be understood that, although the description often refers to the term "lists," a single list may be used.

The access control point processing unit 300 can perform different tasks depending on the type of different fare media 250 and/or information communicated from the fare media 250. For example, verifying a unique ID against lists, as described above, can be performed for all types of media. Alternatively, it can be performed only for fare media without stored-value information, such as open-loop bank cards. For closed-loop, stored-value fare media, the processor 310 can utilize rules stored in memory 320-1 to calculate a fare associated with the transaction and utilize an interface 340, 350, 360 to deduct the fare from a value of the stored-value fare media. If a unique ID is properly verified, or if a transaction using stored-value fare media is successful, the processor 310 can cause the access control point processing unit 300-1 to physically allow or deny passage of a user at the access control point 208.

For successful transactions using stored-value fare media, the access control point processing unit 300-1 can further log priced transaction data relating to a successful transaction as in memory 320-1 and/or communicate the priced transaction data to a station server 224 and/or the central ticketing system 112 through a network interface 330. Depending on desired functionality and reporting requirements, the contents of the priced transaction data can vary. In general, however, it can include a unique ID of the stored-value fare media, the time of day, an identifier and/or location of the access control point 208, a change in value stored on the stored-value fare media, whether changing the value was successful (e.g., whether a write to the stored information was successful), and more.

If the access control point processing unit 300-1 recognizes that a fare media 250 without a stored value is used, it can perform advanced decision logic to determine whether to grant a transit user access at the access control point 208. For example, if the transit user uses an open-loop bank card at the access control point 208, the processor 310 can scan the memory 320-1 to determine if a unique ID associated with the open-loop bank card is on a negative or positive list and grant or deny access to the user accordingly. In alternative embodiments, the processor 310 can gather information from information sources via the network interface 330 and execute decision logic to determine whether to grant or deny the transit user access. Use data then can be created, stored in the memory 320-1, and or sent via the network interface 330. The use data can contain information such as the unique ID, an identifier and/or location of the access control point 208 (e.g., a station, bus route, train, fare zone, etc. in which the access control point 208 is located), a transaction time, and/or other information that can be used in further processing of the transaction. The use data can then be transmitted to a station server 224 and/or the central ticketing system 112 through a network interface 330 at that time, or sometime thereafter.

Figure 3B:
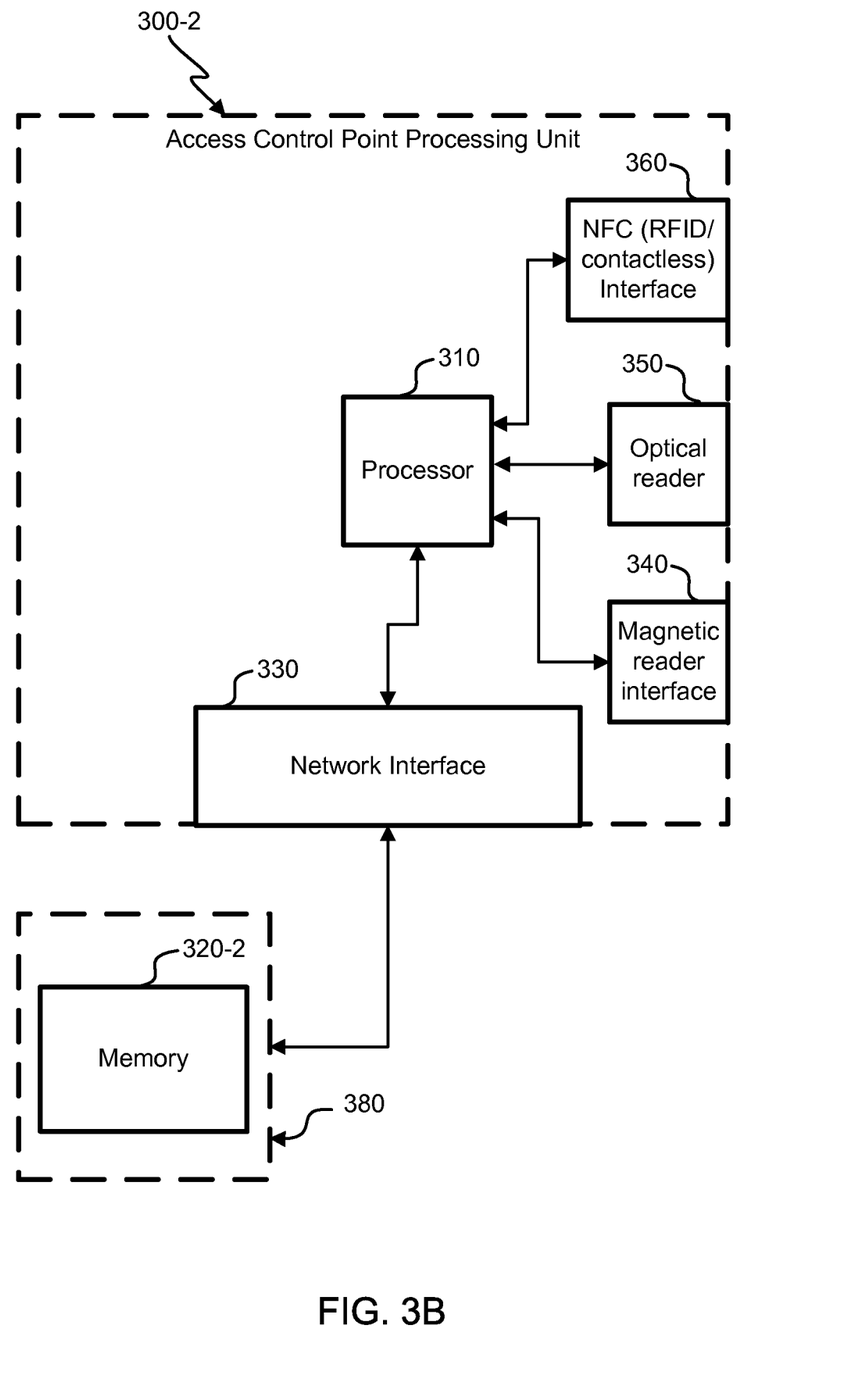
FIG. 3B is a block diagram of an another embodiment of a access control point processing unit that can be used in various embodiments the transit system described herein.

FIG. 3B is a simplified block diagram of an alternative embodiment of a access control point processing unit 300-2. As illustrated, a memory 320-2, which can contain lists and/or list information as described above, may be located at an external source 380, external to access control point processing unit 300-2. The external source 380 can include, for example, station server 224 or station data store 216. In such an embodiment, the processor 310 may communicate with the external source 380 in executing decision logic to determine whether to allow or deny passage of a user at an access control point 208. Additionally or alternatively, the decision logic may be executed by station server 224. In either case, it is desirable to make the decision quickly, often in a few hundred milliseconds or less. Thus, in this embodiment, it can be desirable that the connection between access control point processing unit 300-2 and the external source having memory 320-2 have sufficient speed and minimal latency to provide for a quick decision.

Figure 4:
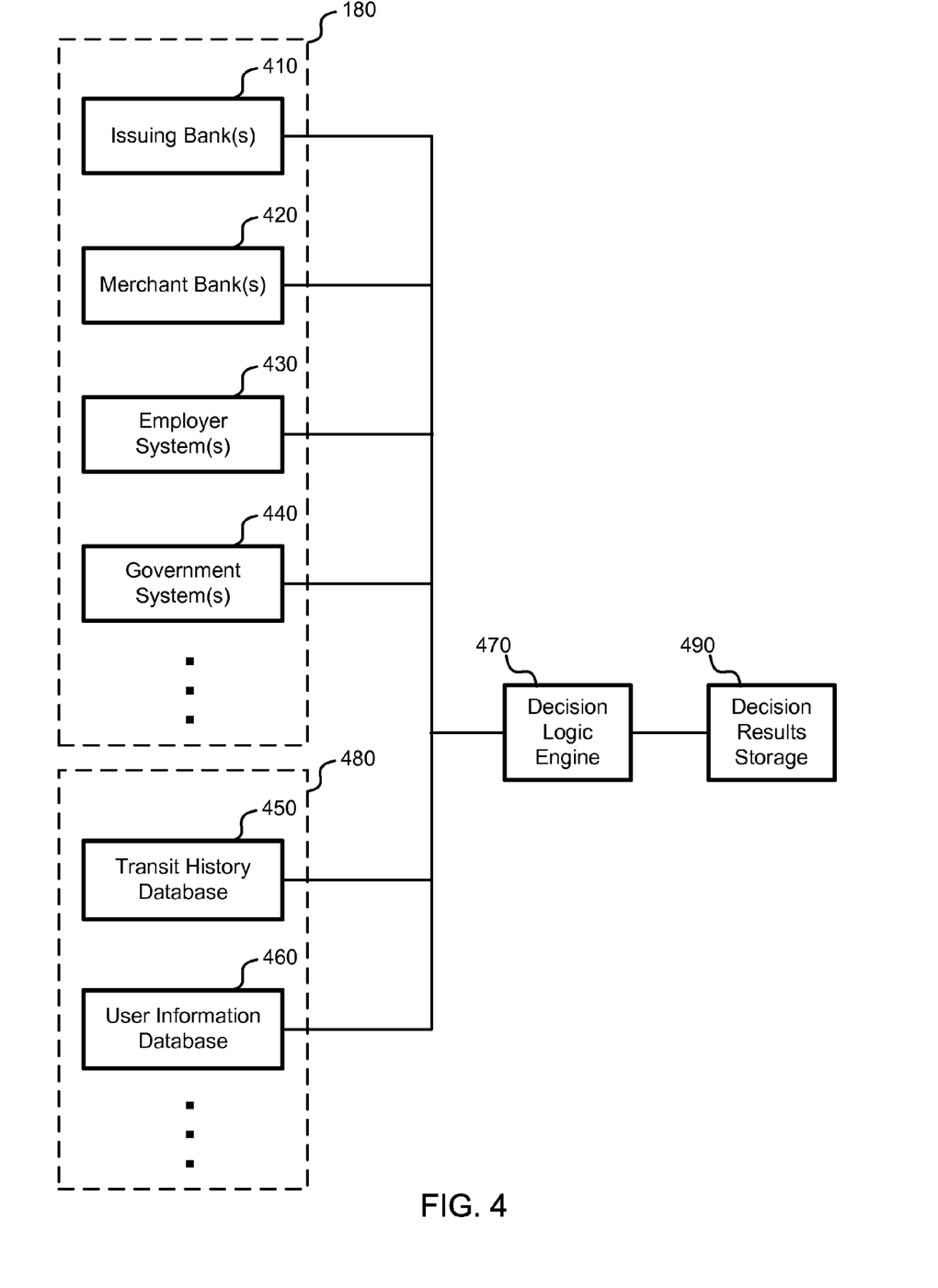
FIG. 4 is a block diagram illustrating the systems involved in the decision logic to determine whether to grant or deny a transit user access at an access control point of the transit system.

FIG. 4 is a block diagram illustrating the systems involved in the decision logic to determine whether to grant or deny a transit user access at an access control point 208 of the transit system 100, where the transit user uses an open-loop bank card (or similar fare media 250) for fare payment. The decision logic follows rules to create a balance between providing transit user convenience and offsetting the risk of the transit agency not getting paid. If an open-loop bank card is determined to be bad, it can be placed on the negative list, and the transit user will be prevented access at an access control point 208 of the transit system 100. However, the rules followed by the decision logic additionally can take into account the likelihood that the open-loop bank card has been or will be made good since being placed on the negative list, avoiding the risk of denying access to a transit user unnecessarily. Thus embodiments described herein use intelligent modeling of the open-loop bank card and/or transit user data in order to make an informed decision whether to grant a transit user using the open-loop bank card access in the transit system 100. In some embodiments, the informed decision can be made beforehand and propagated throughout the transit system 100 to enable access control points 208 to determine whether to grant or deny access to a transit user without having to execute the decision logic in real time. Rules may be added, removed, or modified over time as specific occurrences are noticed or develop.

The decision logic is carried out by a decision logic engine 470 comprised of hardware and/or software that is configured to gather information from external information source(s) 180 and internal information source(s) 480 to which the decision logic engine 470 is communicatively linked. The decision logic engine 470 can reside at one or more locations in the transit system 100, including the central ticketing system 112, the station servers 224, and/or the access control points 208. Depending on desired functionality, including the location of the decision logic engine 470, the decision logic engine 470 can output different decision results, which can be stored in decision results storage 490. As with the decision logic engine 470, the decision results storage 490 can be located at one or more locations in the transit system 100, including the central data store 114, the station data store 216, and/or the memory 320 accessed by the access control point processing unit 300.

The external information source(s) 180 can include one or more of a variety of information sources, such as issuing bank(s) 410. According to some embodiments, a transit agency can partner with the issuing bank(s) 410 to provide a type of open-loop bank card known as a general purpose reloadable (GPR) card. In such instances, the issuing bank(s) 410 can provide an information feed to the decision logic engine 470, with permission by the transit user, which relays certain transactional information associated with the GPR card. This transactional information can include payment history, usage, status, balance, etc., which can be helpful to the decision logic engine 470 in making an intelligent decision of whether to grant a transit user access at an access control point 208.

For example, the decision logic engine 470 can be configured to recognize payment patterns and factor in the payment patterns into its decision logic. The decision logic engine 470 can determine, for instance, to allow a transit user access at an access control point 208 of the transit system 100 even if there is insufficient funds on the GPR card used by the transit user, if the decision logic engine 470 recognizes that a payment is likely to be made to the card in the next few days, at which time the central ticketing system 112 can attempt to gather payment authorization from the issuing bank(s) 410.

Merchant bank(s) 420 can be another source of information utilized by the decision logic engine 470. Merchant bank(s) 420 can include banks providing payment authorization for open-loop bank cards, such as credit and/or debit cards. Information provided by the merchant bank(s) 420 can include and approval and/or a decline code from a previous payment authorization request. Decline codes provided by merchant bank(s) 420 are typically index values (e.g., a number from "00" to "99"), indicating a predetermined description defined by the merchant bank(s) 420. For example, for a particular merchant bank, a decline code of "14" may correspond to the decline code of "insufficient balance." The decision logic engine 470 can have an index or mapping file for each merchant bank to determine the type of decline code.

The decision logic engine 470 can include rules to weigh different decline codes differently. A "hard decline," for example, is a type of decline code indicating that the card will not be approved for any future payments. If the decision logic engine 470 determines that the merchant bank(s) 420 has provided a hard decline in previous payment authorization relating to a particular open-loop bank card, the decision logic engine 470 can deny a transit user access at an access control point 208 when the user attempts to use an open-loop bank card for fare payment. A "soft decline," on the other hand, indicates that an open-loop bank card may be approved for payments sometime in the future. Different soft declines can be weighed differently. For example, if the decision logic engine 470 determines an open-loop bank card has received a soft decline indicating insufficient balance, the decision logic engine 470 may determine to grant access to a transit user if the open-loop bank card has been used repeatedly in the past year with no previous denials of payment authorization. On the other hand, if the soft decline indicates possible fraud, the decision logic engine 470 can be configured to be less inclined to grant access to the transit user.

External information sources 180 can also include employer system(s) 430, government system(s) 440, and more. Employer system(s) 430 can include servers hosted by or for an employer of a transit user that can indicate employment statues as well as whether the transit user receives direct deposit and/or is enrolled in pre-tax or other benefit programs. Such programs can be indicative of an increased likelihood that an open-loop bank card that receives a denial of payment authorization from the merchant bank(s) 420 will be restored and able to pay for the fare some time in the future. Government system(s) 440 can relay information regarding a transit user, including enrollment in programs such as social security or welfare, which also can be indicative that a declined open-loop bank card may be restored to make payments in the future.

A transit history database 450 can be one of the internal information source(s) 480, internal to the transit system, configured to provide the decision logic engine 470 with transit history information collected by the transit system. Transit history information can include various types of information, such as a transit user associated with an open-loop bank card, as well as the frequency, locations, dates, etc. of transit transactions made with the open-loop bank card and/or by the transit user. The decision logic engine 470 can be configured to weigh transit history information differently. For example, the decision logic engine 470 may be less inclined to grant access to a transit user if a particular transaction made by an open-loop fare card deviates significantly from previous transactions made with the open-loop fare card. On the other hand, the decision logic engine 470 may be more inclined to grant access to a transit user if an open-loop bank card has a long history of successful transactions in the transit system 100.

The transit history database 450 can include other information regarding a open-loop bank cards as well, such as velocity and recharge history, which can provide valuable information to help determine the risk of accepting the open-loop bank card as fare payment. For example, if the open-loop bank card is normally used twice per day but is recently used 10 times in a matter of minutes, it could signal fraud or misuse. As another example, the transit history database 450 may have information indicating that funds are added to the account associated with the open-loop bank card every Friday or a direct deposit is used on the last day of each month, which can inform the decision of whether to allow a transit user access if a payment authorization using the open-loop bank card has been declined recently.

A user information database 460 also can be one of the internal information source(s) 480 of the transit system 100. The user information database 460 can include a variety of data regarding a transit user, including information correlating a particular open-loop bank card (or other fare media 250) to a particular transit user. The information can be collected automatically and/or provided by a user as part of a registration process, and can be used by the decision logic engine 470 to determine whether to grant access to a transit user. For example, the user information database 460 may have information indicating that a particular transit user qualifies for reduced fares (e.g., the transit user is a student or a senior). This information may be used by the decision logic engine 470 as a factor weighing for granting access to a transit user at an access control point 208 of the transit system.

The decision results storage 490 can store the results of the decision logic engine 470 in any of a variety of ways. As indicated elsewhere herein, the results can be stored in lists (e.g., positive and/or negative lists) that indicate whether to grant access to a transit user. Such lists, and other forms of decision result information, can be useful in enabling systems that do not have access to information sources 180, 480, or cannot access the information sources 180, 480 and make a determination to grant or deny access to a transit user in an acceptably short amount of time. Because latency and response time of the communication between the decision logic engine and the information sources 180, 480 may not allow for real-time decision to be made when a transit user presents an open-loop bank card or other fare media 250 at an access control point 208, the predetermined decision results provided in the decision results storage can be created beforehand and used instead. In some embodiments, for example, an access control point 208 may not be in communication with the information sources 180, 480, but has access to the decision results storage 490 in the form of lists stored in memory 320 of the access control point processing unit 300 or elsewhere.

In addition or as an alternative to negative and positive lists, an open-loop bank card can be associated with a "score" or other value, which is determined by the decision logic engine in light of the information provided by the information sources 180, 480. For example, a score may be a numerical value between 0 and 500, where 0 is associated with open-loop bank cards that are least likely to be authorized for fare payment, and 500 is associated with open-loop bank cards that are most likely to be authorized for fare payment. Open-loop bank cards can start with an initial score, such as 250, which is then adjusted according to information from the various information sources 180, 480. The decision logic engine 470 may increase the score if it receives information indicating a long history of successful payment authorizations provided by the merchant bank(s) 420, for example. On the other hand, the decision logic engine 470 may decrease the score if it receives certain denial codes provided by the merchant bank(s) 420 for past transactions and/or unfavorable financial transaction information from the issuing bank(s) 410. The updated score then can be stored in the decision results storage and correlated with the unique ID of the open-loop bank card. The scores for all open-loop bank cards then can be propagated throughout the transit system 100 so that the scores can be accessed in real time when a transit user presents an open-loop bank card at an access control point 208. A system processing the transaction, such as the access control point processing unit 300 and/or the station server 224 can then make a quick determination of whether to grant access to the transit user if the score associated with the unique ID of the open-loop bank card is above a certain threshold value. Moreover, the transit agency can adjust the threshold value for additional functionality. For example, the threshold value may vary based on location, time of day, and/or other factors, enabling a transit agency additional flexibility in determining the proper balance of consumer experience and risk of nonpayment. Of course, numerous variations can be made to this example, such as altering values, ranges, and components involved.

Figure 5A:
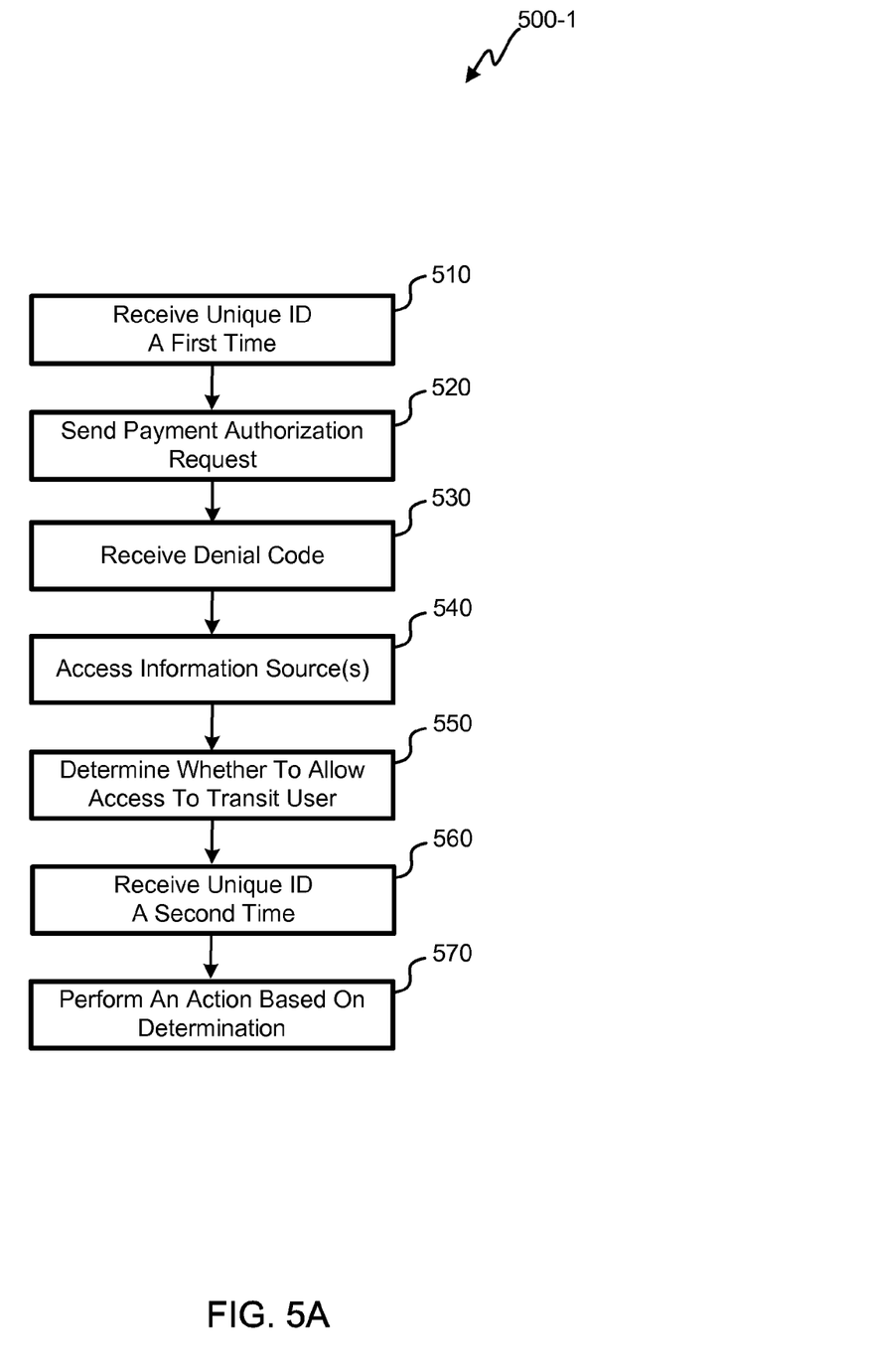
FIG. 5A is a flow diagram illustrating an embodiment of a method for determining whether to allow a transit user access at an access control point of the transit system.

FIG. 5A is a flow diagram illustrating an embodiment of a method 500-1 for determining whether to allow a transit user access at an access control point 208 of the transit system 100. The method 500-1, which can be executed by a combination of access control points 208, the central data store 114, and/or the station data store 216, can begin at block 510, where a unique ID is received at a first time. As discussed earlier, a unique ID for a fare media such as an open-loop bank card can be a PAN or other account identifier unique to the fare media and associated with a financial account and/or other funding source 165.

At block 520, a payment authorization request is sent. Depending on the functionality of the systems involved in receiving the unique ID is received at the first time, the payment authorization request can be made after a transit user is denied access at an access control point 208 of the transit system 100 in correlation with the receipt of the unique ID at block 510. At block 530, an denial code is received, indicating a type of denial relating to the fare media.

At block 540, information source(s) 180, 480 are accessed, providing additional information by which, at block 550, a determination is made whether to allow access to a transit user who uses the fare media having the unique ID received at block 510. As indicated earlier, the information can include information related to the user and provided by a financial institution associated with the financial account, an employer system, and/or a government system.

At block 560, the unique ID is received at a second moment time. Here, the transit user presenting the fare media with the unique ID can be at a different access control point 208 than the access control point 208 used at the first time when the unique ID was received in 510. Nonetheless, the determination of whether to allow access to the transit user can be propagated throughout the transit system 100 such that a system, such as the access control point 208 the transit user is at during the second time, can perform an action based on the determination, at block 570. As indicated herein the action can vary, depending on the systems involved and the determination made. In particular, if the determination is to grant access to the transit user, the access control point 208 can perform the action of granting the transit user access.

Figure 5B:
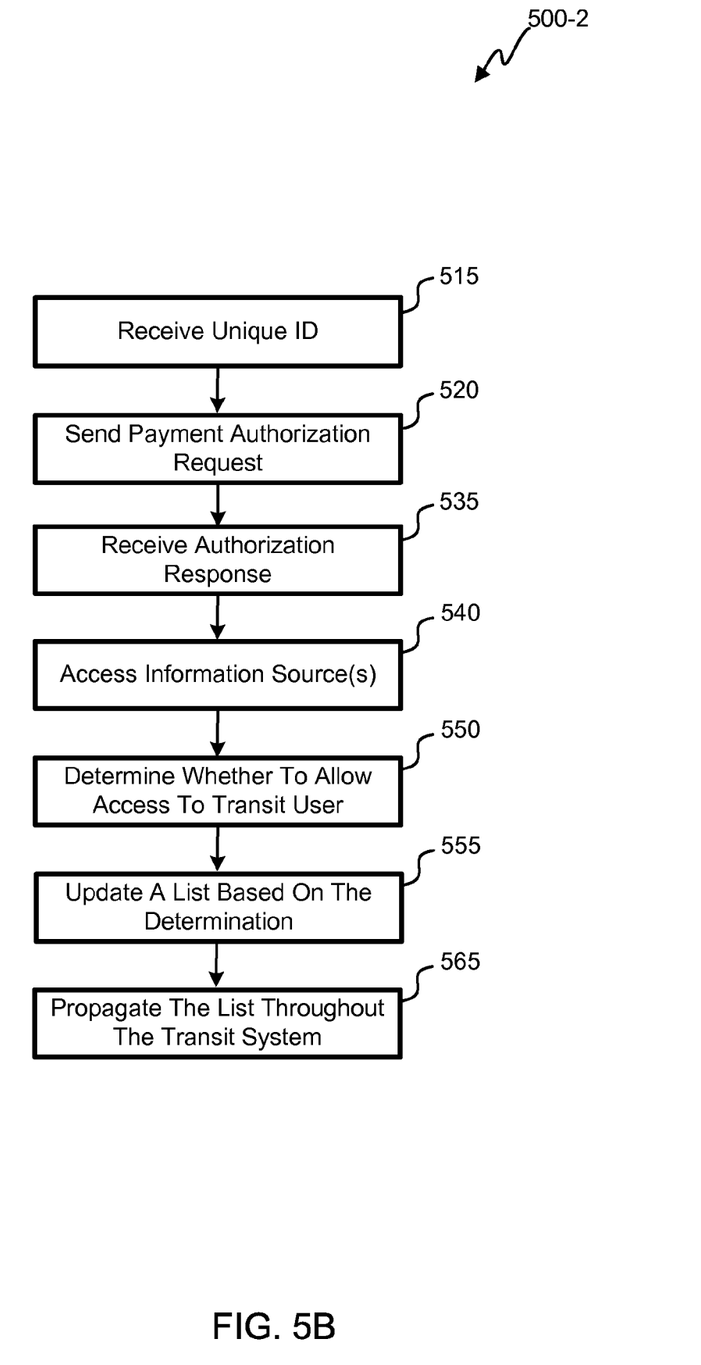
FIG. 5B is a flow diagram illustrating another embodiment of a method for determining whether to allow a transit user access at an access control point of the transit system.

FIG. 5B is a flow diagram illustrating an embodiment of another method 500-2 for determining whether to allow a transit user access at an access control point 208 of the transit system 100. As opposed to the method 500-1 of FIG. 5A, this method 500-2 utilizes lists. Additionally, this method 500-2 can be executed by a single central system, such as the central ticketing system 112, although other systems may be involved.

As with the method 500-1 of FIG. 5A, the method 500-2 can start by receiving a unique ID at block 515 and sending a payment authorization request at block 520. At block 535, an authorization response is received, indicating an approval or denial code. In either case, the information source(s) 180, 480 can be accessed, at block 540, and a determination can be make, at block 550, whether to allow access to a transit user using the fare media corresponding to the unique ID received at block 515. At block 555, negative and/or positive lists can be updated based on the determination, and at block 565, the list(s) can be propagated throughout the transit system 100. As indicated earlier, list(s) can be stored at access control points 208 throughout the transit system 100 to help enable the access control points 208 to make a quick determination of whether to grant access to a transit user having a fare media with a unique ID by simply looking up the unique ID, and/or information relating to the unique ID, on a list.

Figure 5C:
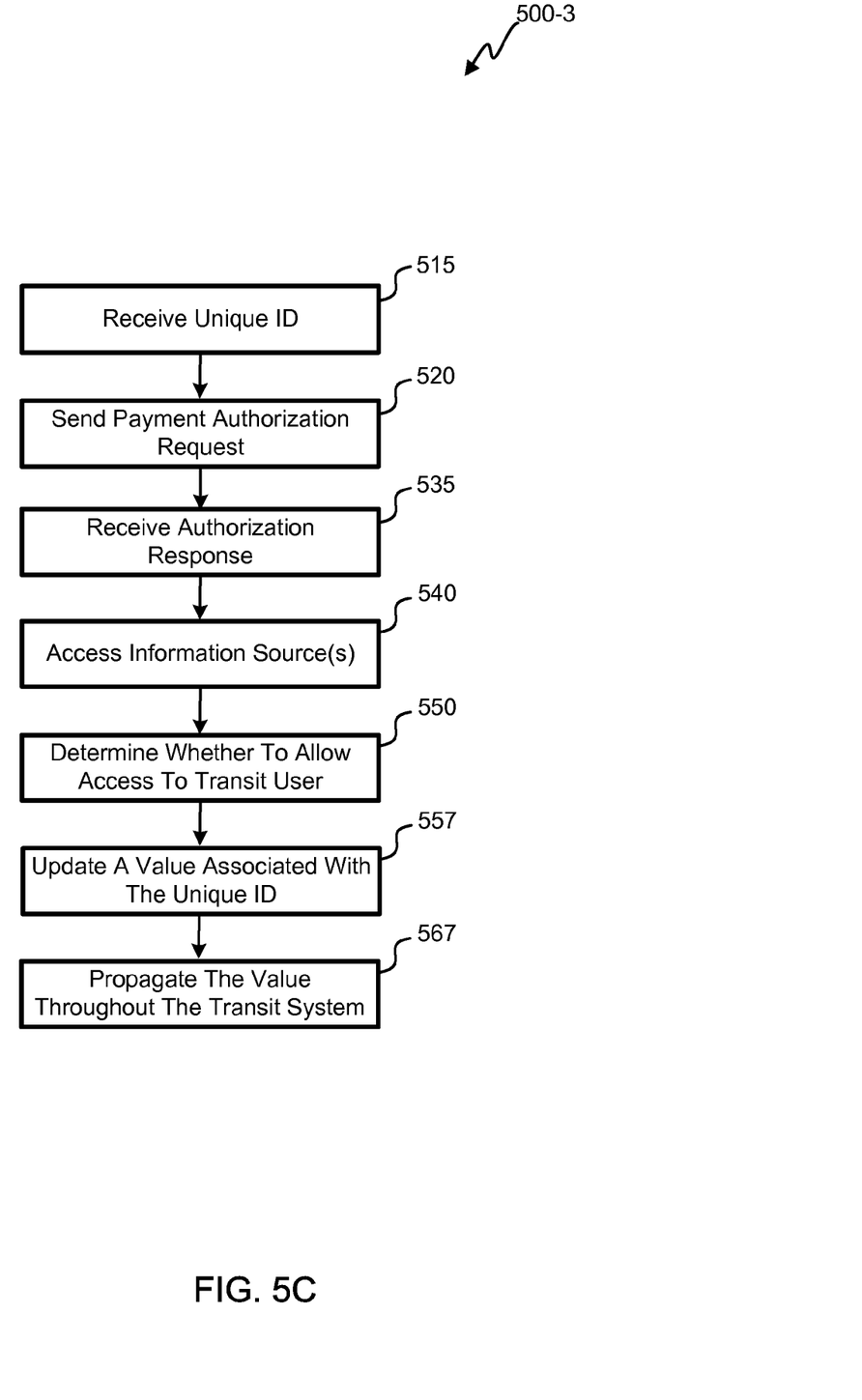
FIG. 5C is a flow diagram illustrating yet another embodiment of a method for determining whether to allow a transit user access at an access control point of the transit system.

FIG. 5C is a flow diagram illustrating an embodiment of yet another method 500-3 for determining whether to allow a transit user access at an access control point 208 of the transit system 100. The blocks of method 500-3 are similar to the blocks of the method 500-2 of FIG. 5B. Rather than use the list(s) as described in correlation with method 500-2, however, method 500-3 includes, at block 557, updating a value associated with the unique ID received at block 515. As indicated earlier, the value can be a "score" associated with the unique ID that can indicate a level of likelihood that a payment authorization will be received for subsequent transactions made by the fare media associated with the unique ID. The score can be stored and/or propagated in various forms, including a list having different scores associated with different unique IDs.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-readable, or computer-readable, instructions, which may be used to cause a machine, such as a general-purpose or special-purpose processor or logic circuits programmed with the instructions to perform the methods. These machine-readable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

The methods, systems, devices, graphs, and tables discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

What is claimed is:

1. A method for determining to grant access to a user at an access control point of a transit system, the method comprising:
   receiving an account identifier from a fare media at a first time for access to the transit system, wherein the account identifier is:
   unique to the fare media; and
   associated with a financial account;
   sending information indicative of the account identifier for authorization of a payment for immediate access to the transit system, the payment being received at the access control point of the transit system;

receiving a denial code indicating a denial of the authorization of the payment, wherein the denial code comprises information indicative of a type of the denial;

accessing at least one information source having information related to the user, wherein the at least one information source includes historical information regarding prior transactions in the transit system made with the fare media;

making a determination, by a processor, to grant the user access to the transit system at the access control point of the transit system based, at least in part, on the information indicative of the type of the denial and the information related to the user from the at least one information source;

causing information indicative of the determination to be provided to a plurality of access control points of the transit system;

receiving, at one of the plurality of access control points, the account identifier from the fare media at a second time for access to the transit system; and granting the user access to the transit system at the second time at the one of the plurality of access control points of the transit system based at least in part on the determination;

activating a gate or turnstile, based on the granting, to physically allow the user to access the transit system;

following a set of rules to determine when a user is granted access to the transit system, wherein the set of rules comprises a rule for determining access based on a denial code; and modifying the set of rules based on one or more of a payment history, usage, status, or balance of the fare media, wherein the determination whether to grant access to the user is further based, at least in part, on the set of rules.

2. The method for determining to grant access to the user at the access control point of the transit system as recited in claim 1, further comprising sending information indicative of the determination to the access control point.

3. The method for determining to grant access to the user at the access control point of the transit system as recited in claim 2, further comprising storing the information indicative of the determination at one or more of the access control point and the plurality of access control points.

4. The method for determining to grant access to the user at the access control point of the transit system as recited in claim 3, further comprising storing the information indicative of the determination on a list having information for granting access to the transit system.

5. The method for determining to grant access to the user at the access control point of the transit system as recited in claim 1, wherein the information related to the user comprises a value.

6. The method for determining to grant access to the user at the access control point of the transit system as recited in claim 5, further comprising updating the value based, at least in part, on the denial code.

7. The method for determining to grant access to the user at the access control point of the transit system as recited in claim 5, wherein making the determination whether to grant access to the user at the access control point of the transit system is based, at least in part, on whether the value exceeds a certain threshold value.

8. The method for determining to grant access to the user at the access control point of the transit system as recited in claim 1, wherein the at least one information source comprises one or more of:

a financial institution associated with the financial account,
an employer system, or
a government system.

9. The method for determining to grant access to the user at the access control point of the transit system as recited in claim 1, wherein the historical information regarding prior transactions comprises one or more of:

a use history,
a recharge history, or
a velocity history.

10. The method for determining to grant access to the user at the access control point of the transit system as recited in claim 1, wherein the plurality of access control points comprises the access control point.

11. A system for executing advanced decision logic for transit acceptance, the system comprising:

a communication interface coupled to a data communication network and configured to receive information indicative of an account identifier from a fare media at a first time for access to a transit system, wherein the account identifier is: unique to the fare media;

and associated with a financial account;
an authorization subsystem configured to:
send information indicative of the account identifier for authorization of a payment for immediate access to the transit system, the payment being received at the access control point of the transit system; and receive an authorization response indicating a denial of the authorization of the payment, wherein the authorization response comprises a denial code comprising information indicative of a type of the denial;

a processor communicatively coupled with the communication interface and the authorization subsystem, and configured to:

access at least one information source having information related to a user associated with the account identifier, wherein the at least one information source includes historical information regarding prior transit transactions made with the fare media;

make a determination to grant the user access to the transit system at the access control point of the transit system based, at least in part, on the information indicative of a type of the denial and the information related to the user from the at least one information source;

cause information indicative of the determination to be send to a plurality of access control points of the transit system using the communication interface;

receiving receive, at one of the plurality of access control points, the account identifier from the fare media at a second time for access to the transit system; and grant the user access to the transit system at the second time at the one of the plurality of access control points of the transit system based at least in part on the determination;

activate a gate or turnstile, based on the granting, to physically allow the user to access the transit system;

follow a set of rules to determine when a user is granted access to the transit system, wherein the set of rules comprises a rule for determining access based on a denial code; and modify the set of rules based on one or more of a payment history, usage, status, or balance of the fare media, wherein the determination whether to grant access to the user is further based, at least in part, on the set of rules.

12. The system for executing the advanced decision logic for transit acceptance as recited in claim 11, further comprising a database configured to store at least a portion of the historical information regarding the prior transit transactions made with the fare media.

13. The system for executing the advanced decision logic for transit acceptance as recited in claim 11, further comprising an access control point communicatively coupled with the communication interface and configured to receive the information indicative of the determination.

14. The system for executing the advanced decision logic for transit acceptance as recited in claim 13, wherein the access control point includes a memory configured to store the information indicative of the determination on a list having information for granting access to the transit system.

15. The system for executing the advanced decision logic for transit acceptance as recited in claim 11, wherein the processor is configured to make the determination whether to grant access to the user at the access control point of the transit system based, at least in part, on whether a value computed using the information related to the user exceeds a certain threshold value.

16. A non-transitory storage medium with computer-readable instructions for determining whether to grant access to a user at an access control point of a transit system, the instructions comprising code for:
  receiving an account identifier from a fare media at a first time for access to the transit system, wherein the account identifier is:
  unique to the fare media; and
  associated with a financial account;
  sending information indicative of the account identifier for authorization of a payment for immediate access to the transit system, the payment being received at the access control point of the transit system;
  receiving an authorization response indicating a denial of the authorization of the payment, wherein the authorization response comprises a denial code comprising information indicative of a type of the denial;
  accessing at least one information source having information related to the user, wherein the at least one information source includes historical information regarding prior transactions in the transit system made with the fare media;
  making a determination whether to grant the user access to the transit system at the access control point of the transit system based, at least in part, on the information indicative of a type of the denial and the information related to the user from the at least one information source;
  causing information indicative of the determination to be provided to a plurality of access control points of the transit system;
  receiving, at one of the plurality of access control points, the account identifier from the fare media at a second time for access to the transit system; and
  granting user access at the second time at the one of the plurality of access control points based on the determination;
  activating a gate or turnstile, based on the granting, to physically allow the user to access the transit system;
  following a set of rules to determine when a user is granted access to the transit system, wherein the set of rules comprises a rule for determining access based on a denial code; and
  modifying the set of rules based on one or more of a payment history, usage, status, or balance of the fare media, wherein the determination whether to grant access to the user is further based, at least in part, on the set of rules.

17. The non-transitory storage medium with the computer-readable instructions for determining whether to grant access to the user at the access control point of the transit system as recited in claim 16, wherein the instructions comprising the code for performing the action at the access control point include instructions for granting access to the user at the access control point of the transit system.

18. The non-transitory storage medium with the computer-readable instructions for determining whether to grant access to the user at the access control point of the transit system as recited in claim 16, wherein the instructions further comprise code for sending information indicative of the determination to the access control point.

19. The non-transitory storage medium with the computer-readable instructions for determining whether to grant access to the user at the access control point of the transit system as recited in claim 16, wherein the instructions further comprise code for storing the information indicative of the determination at the access control point.

20. The non-transitory storage medium with the computer-readable instructions for determining whether to grant access to the user at the access control point of the transit system as recited in claim 16, wherein the information related to the user comprises a value.

21. The non-transitory storage medium with the computer-readable instructions for determining whether to grant access to the user at the access control point of the transit system as recited in claim 20, wherein the instructions further comprise code for updating the value based, at least in part, on the authorization response.

\* \* \* \* \*